United States Patent [19]

Nakayama et al.

[11] 4,303,762

[45] Dec. 1, 1981

[54] LOW SHRINKING UNSATURATED POLYESTER RESIN COMPOSITION

[75] Inventors: Masaharu Nakayama, Nagoya; Masaru Matsushima, Aichi; Shigeki Banno, Aichi; Nobuo Kanazawa, Aichi, all of Japan

[73] Assignee: Nippon Oil and Fats Co., Ltd., Tokyo, Japan

[21] Appl. No.: 210,101

[22] Filed: Nov. 24, 1980

[30] Foreign Application Priority Data

Nov. 30, 1979 [JP] Japan .................................. 54/155036

[51] Int. Cl.³ ............................................ C08F 293/00
[52] U.S. Cl. ................... 525/299; 260/40 R; 525/63; 525/92; 525/167; 525/309
[58] Field of Search ................... 525/63, 92, 167, 299, 525/309; 260/40 R

[56] References Cited

U.S. PATENT DOCUMENTS 3,644,574  2/1972  Jackson, Jr. et al. ................ 525/175

*Primary Examiner*—J. Ziegler
*Attorney, Agent, or Firm*—Blanchard, Flynn, Thiel, Boutell & Tanis

[57] ABSTRACT

A composition of matter which is prepared by blended with an unsaturated resin with a block copolymer which is obtained by employing a polymeric peroxide has dispersion stability during long storage found in no conventional one.

A hardened moulding product obtained from the aforementioned composition matters is small in its volume shrinkage and exhibit smoothness and gloss to the surface thereof even it is employed after long period storage.

3 Claims, No Drawings

LOW SHRINKING UNSATURATED POLYESTER RESIN COMPOSITION

BACKGROUND OF THE INVENTION

Field of the Invention

This invention relates to a low shrinking unsaturated polyester resin composition which possesses excellent dispersion stability on storage and which comprises an unsaturated polyester resin and a block copolymer.

Sheet molding compositions (hereinafter designated as SMCs) produced by blending unsaturated polyester resins with filler, pigment, thickening agent, fibrous reinforcement, hardening agent, stabilizer, mold releasing agent, bulk molding compounds and the like have been used in increasing amounts as new industrial materials for use in the field of machine molding. These compositions fulfill the requests for materials capable of reducing the labor cost and improving the productivity and the working environment in the reinforced plastic industries.

Attempts have been made to decrease the volume shrinkage of unsaturated polyester resins on hardening by blending the unsaturated polyester resins with thermoplastic resins such as polystyrene, poly(methylmethacrylate) and the like, as a low shrinkage agent. Application of the thus obtained low shrinking unsaturated polyester resin compositions as industrial materials in the field of machine molding should greatly contribute to improve this class of molding materials, in a high degree, because the resulting molded products can be considerably improved in their appearance and dimensional accuracy.

A conventional low shrinking resin composition prepared by blending low shrinking agents with the unsaturated polyester resins, together with filler, pigment, thickening agent, fibrous reinforcement, hardening agent, stabilizer, mold releasing agent and the like, can give molded products having excellent gloss and surface smoothness when molding is performed soon after blending of the composition.

However, the conventional low shrinking resin composition has the drawback that the low shrinking agent, which initially exists, in a dispersed state therein, gradually fails to maintain the dispersed state during storage and results in spoilage of the dispersion stability, because of the migration of polymerizable monomers dissolved in the low shrinking agent. Thus, the composition loses the ability of imparting an excellent gloss and smoothness to the surface of the hardened molded products.

As a process for improving the dispersion stability of such a low shrinking unsaturated polyester resin composition, a process, for example, which is described in Japanese Patent Laid-Open Publication No.SHO 52-21092 (1977), has been proposed, wherein a graft copolymer composition having a fine gel structure is blended, as the low shrinking agent, with the unsaturated polyester resin for improving the dispersion stability on storage. The graft copolymer composition having the fine gel-structure is prepared by graft-copolymerizing an emulsion of gum material with a styrene type monomer and a vinyl type monomer which is copolymerizable with a small quantity of methacrylic acid ester and/or acrylic acid ester.

It is true that the graft copolymer composition having the fine gel-structure of the process is excellent in dispersion stability when it is blended with the unsaturated polyester resin, as compared with conventional low shrinking agents, such as polystyrene and polymethylmethacrylate. However, the composition is not sufficient enough in the dispersion stability, since it contains a lesser amount of the graft copolymer and a larger amount of homopolymers of the above mentioned monomers because of the low efficiency of the graft-copolymerization.

SUMMARY OF THE INVENTION

An object of this invention is to provide a low shrinking unsaturated polyester resin composition which is excellent in dispersion stability.

Another object of this invention is to provide an unsaturated polyester resin composition, which shows little volume shrinkage on hardening even after a long period of storage, and which can produce hardened molded products having an excellent smooth and bright surface.

This invention is accomplished based on the findings that a block copolymer mixture, which is prepared by first polymerizing a monomer using a polymeric peroxide, as a polymerization initiator, to produce a copolymer having peroxy bonds in the molecule and by further polymerizing another monomer with the thus-obtained copolymer, is composed of block copolymers and homopolymers, but contains the block copolymer in a large amount because of the high efficiency of block copolymerization, such as 70 to 80%. and that a non-aqueous dispersion resin composition containing this block copolymer mixture exhibits a very excellent dispersion stability. This invention is attained also based on the finding that a composition of matter which is prepared by blending an unsaturated polyester resin with a block copolymer, which is obtained by block-copolymerizing of vinyl acetate monomer or a monomer mixture of vinyl acetate and a small amount of other monomer, with a monomer other than the aforementioned monomer, and a mixture of the said composition of matter which is blended with filler, pigment, thickening agent, fibrous reinforcement, hardening agent, stabilizer, mold releasing agent and the like have a dispersion stability not found in conventional compositions.

The hardened molded product obtained from the said composition of matter or the said mixture of the said composition of matter and the filling materials is small in its volume shrinkage on hardening after a long period of storage and possesses excellent smoothness and gloss to the surface thereof.

According to the present invention, there is provided an unsaturated polyester resin composition which comprises (a): 20 to 70% by weight of an unsaturated polyester (hereinafter the values of % mean weight %);

(b): 20 to 70% of a polymerizable monomer; and (c): 1 to 20% of a block copolymer mixture which is defined hereinbelow.

The above-stated block copolymer mixture is prepared by first polymerizing either one monomer or monomers of (i): 10 to 90 parts by weight of a monomer or a monomer mixture consisting of 70 to 100% by weight of vinyl acetate and 30 to 0% by weight of a monomer copolymerizable with vinyl acetate (hereinafter designated as (i) group monomer and the values of parts and % meaning parts by weight and % by weight, respectively), (ii): 90 to 10 parts of a monomer or a monomer mixture consisting of 0 to 100% of a styrene type monomer and 100 to 0% of an acrylate and/or a methacrylate, (hereinafter designated as (ii) group monomer) using, as a polymerization initiator, a polymeric peroxide of the general formula,

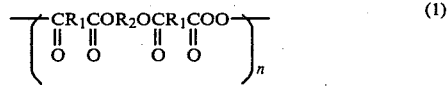
(1)

wherein $R_1$ is an alkylene group or a substituted alkylene group having 1 to 18 carbon atoms or cycloalkylene or a substituted cycloalkylene group or a phenylene or a substituted phenylene group having 3-15 carbon atoms, $R_2$ is (1) an alkylene or a substituted alkylene group having 2-10 carbon atoms, (2) a group of the formula

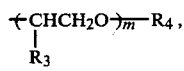

wherein $R_3$ is hydrogen or methyl, $R_4$ is an alkylene group having 2 to 10 carbon atoms and m is an integer of 1 to 13, (3)

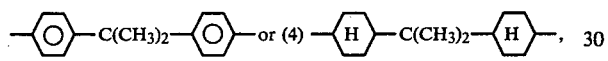

and n=2 to 10 thereby obtaining a copolymer mixture having peroxy bonds in the molecule thereof and then copolymerizing the same with a monomer or a monomer mixture which is either said (i) or (ii) group monomer and which is employed in the first polymerization.

The unsaturated polyester resin used in this invention is produced from an $\alpha,\beta$-unsaturated dibasic acid, a saturated dibasic acid, or glycols. As the $\alpha,\beta$-unsaturated dibasic acid herein stated there are mentioned maleic acid anhydride, maleic acid, fumaric acid, mesaconic acid, tetraconic acid, itaconic acid, chlorinated maleic acid, an alkyl ester of these acids or the like. As the saturated dibasic acid there are mentioned phthalic acid anhydride, phthalic acid, isophthalic acid, terephthalic acid, tetrahydrophthalic acid, a halogenated phthalic acid anhydride, adipic acid, succinic acid, sebacic acid, an alkyl ester or these acids or the like. Glycols are, for example, ethylene glycol, diethylene glycol, propylene glycol, dipropylene glycol, butylene glycol, neopentyl glycol, hexylene glycol, hydrogenated bisphenol A, 2,2'-di(4-hydroxypropoxyphenyl) propane, 2,2'-di(4-hydroxyethoxyphenyl) propane, ethylene oxide, propylene oxide and the like.

The polymerizable monomer used in this invention is, for example, a styrene type monomer such as stylene, vinyl toluene, $\alpha$-methyl styrene, t-butyl styrene, and a chlorostyrene; diallyl phthalate; vinyl acetate; acrylic acid esters; and methacrylic acid esters. Of these monomers, a styrene type monomer is especially preferable.

As the monomer copolymerizable with vinyl acetate, which is employed in the production of the block copolymer of this invention there are mentioned ethylene, vinyl chloride, vinylidene chloride, vinyl esters, and allyl esters.

The block copolymer mixture used in this invention can be easily produced by a polymerization according to a known process, for example, a conventional block copolymerization process, suspension polymerization process or emulsion polymerization process using the polymeric peroxide shown in formula (1) as the polymerization initiator. In such a case, the copolymer having peroxy bonds in the molecule thereof, which is produced in the first polymerization reaction, can be either separated as an intermediate for use as the starting material for the subsequent block copolymerization or successively used for the block-copolymerization without separation from the reaction system.

The amount of the polymeric peroxide to be used is 0.1 to 10 parts based on 100 parts of the amount of the monomer or monomer mixture described in the above (a) or (b).

Preferable polymerization temperature is 40° to 90° C. for a polymerization time of 2 to 15 hours.

The polymeric peroxide employed for the production of the block copolymer composition of this invention can be easily produced by reacting a dibasic acid chloride having ester-bonds in the molecule thereof with sodium peroxide according to a process for producing a concentional diacyl peroxide as shown in the following reaction scheme (11)

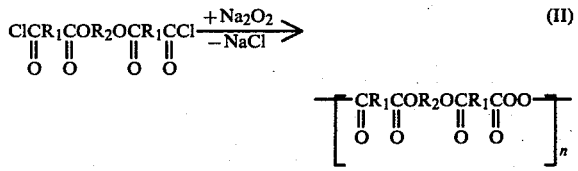
(II)

wherein $R_1$ and $R_2$ are the same as in general formula (1).

Illustrative typical polymeric peroxides of the general formula (1) are the following.

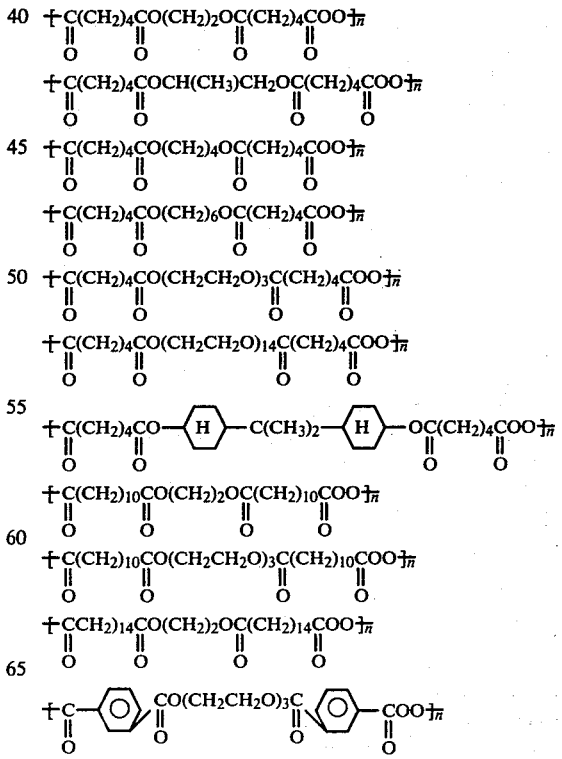

-continued

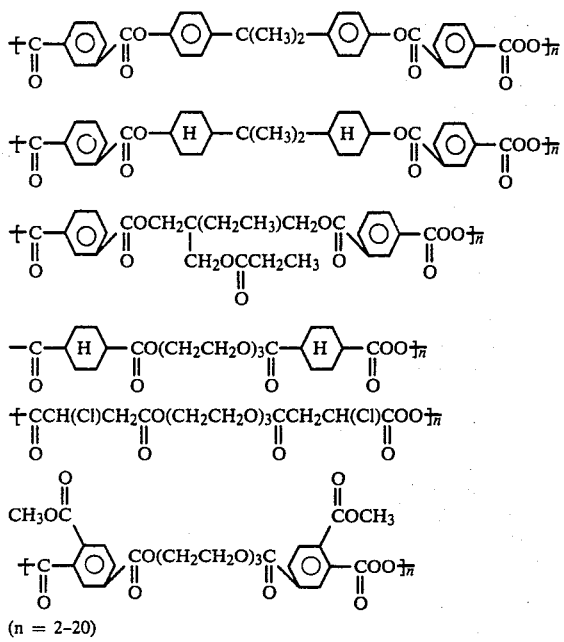

(n = 2-20)

In this invention, it is preferable to blend the block copolymer mixture to the unsaturated polyester resin in an amount of 1 to 20%. Blending of the mixture in an amount of less than 1% fails to develop the effect of suppressing the shrinkage. The blending amount of more than 20% may result in a decrease in the mechanical strength of the hardened product.

The composition of matter prepared by blending the block copolymer composition of this invention with the unsaturated polyester resin is very excellent in dispersion stability, since the block copolymer composition of this invention is of high block formation efficiency and contains lesser amounts of polymers other than the block copolymer. It exhibits less volume shrinkage on hardening even after a long period of storage and gives a hardened molded product having spendid smoothness and gloss of the surface thereof wherein the pigment applied onto the surface thereof is free from color segregation.

The unsaturated polyester resin composition of this invention is used for molding processing, after blending therein, according to need, with properly selected additives of a hardening agent, a filler, a pigment, a thickening agent, a fibrous reinforcement, a stabilizer, a mold release agent, a flame retarder and the like which are used for conventional unsaturated polyester resins.

Further detailed explanation of this invention is given hereinbelow by reference to Examples, Reference Examples and Comparative Examples,. In each Example the values of parts and percentages mean parts by weight and percent by weight except otherwise stated.

PREFERRED EMBODIMENTS OF THE INVENTION

Reference Example 1

Production of

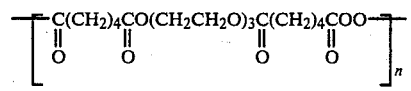

Into a glass reaction vessel provided with a thermometer and a stirrer, there were charged 183 parts of adipoyl chloride and 75 parts of triethylene glycol. The contents of the reaction vessel were reacted under agitation in a reaction temperature range of 20° to 30° C., and maintaining the pressure of 40 to 50 mm Hg for 60 minutes, whereby 220 parts of colourless viscous liquid of tri-ethylene glycol-bis (adipoyl chloride) were produced.

Into a second glass reaction vessel provided with a thermometer, a stirrer and a feeding funnel, there was charged an aqueous solution of sodium peroxide which was prepared by the reaction of 30 parts of a 50% aqueous solution of hydrogen peroxide and 832 parts of a 5% aqueous solution of sodium hydroxide.

Then, 176 parts of triethylene glycol-bis (adipoyl chloride) obtained in the above reaction was charged into the second reaction vessel through the feeding funnel and maintaining the reaction temperature in the range of 0° to 5° C. under agitation.

After the completion of the addition, the agitation was continued for 30 minutes in a temperature range of 0° to 5° C. to complete the reaction. The resultant precipitate was separated by filtration, followed by washing it with water twice and drying at reduced pressure, thereby obtained 140 parts of a white solid. The white solid was dissolved in 360 parts of chloroform and the resultant solution was poured into 1600 parts of methanol for the purification by recrystallization.

After the separation by filtration and vacuum-drying, 108 parts of white solid were obtained.

The obtained white solid showed the below mentioned characteristics and it was confirmed, therefore, that the solids were the polymeric peroxide of

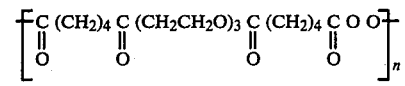

The molecular weight was measured by VPO (Apparatus for Measuring Molecular weight by the process of Gas pressure Equilibrium, Model 115 made by Hitachi Ltd.)

| | |
|---|---|
| Purity measured by the iodine titration | 99.7% |
| Decomposition temperature | 90° C. |
| Molecular weight | 2140 (n = 5.3) |
| Infra red absorption spectrum | |
| 1725 cm$^{-1}$(C=O bonding of ester groups) 1780 cm$^{-1}$(C=O bonding of diallyl groups) 875 cm$^{-1}$(O=O bonding) | |
| Nuclear Magnetic Resonance Spectrum | |
| T: 8.24 ppm (8H, CH$_2$ CH$_2$ C O CH$_2$) T: 7.56 ppm (8H, CH$_2$ CH$_2$ C O CH$_2$) T: 6.28 ppm (8H, CH$_2$ CH$_2$ O CH$_2$) T: 5.72 ppm (4H, CH$_2$ C O CH$_2$ CH$_2$) | |

Reference Example 2

Production of

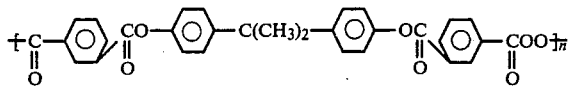

Into a glass reaction vessel which was provided with a thermometer, and a stirrer, there were charged 183 parts of isophthalic chloride, 103 parts of 2,2-di(4-hydroxyphenyl) propane, and 675 parts of toluene. The contents of the reaction vessel were reacted under agitation in a reaction temperature range of 70°–75° C. for 2 hours, whereby 909 parts of a colorless toluene solution of the formula polymeric peroxide compound were obtained.

The resultant product contained 27.5% of the acid chloride.

It was prepared and purified according to the same procedures as those described in Reference Example 1, thereby obtaining 371 parts of a white solid which showed the below mentioned characteristics.

| Purity measured by the iodine titration | 97.5% |
|---|---|
| Decomposition temperature | 120° C. |
| Molecular weight | 1829 (n = 3.5) |
| Infra red absorption spectrum | |
| 1725 cm$^{-1}$ (C=O bonding of ester groups) | |
| 1770 cm$^{-1}$ and 790 cm$^{-1}$ (C=O bonding of diacyl groups) | |
| 865 cm$^{-1}$ (O=O bonding) | |

It was recognized that the white solid was the polymeric peroxide of

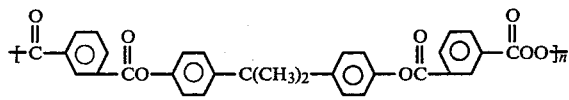

Reference Example 3

Production of vinyl acetate-styrene block copolymer composition

Part 1.

Into a glass reaction vessel provided with a thermometer, a stirrer and a condenser, there were charged 300 parts of 1.0% aqueous solution of polyvinyl alcohol and a solution which was prepared by dissolving 0.5 part of the polymeric peroxide obtained in Reference Example 1 into 10 parts of vinyl acetate (hereinafter referred to as VAC).

After the substitution of the air in the reaction vessel with nitrogen gas, the polymerization was initiated by heating the contents of the reaction vessel up to a temperature of 60° C.

Keeping the temperature at 60° C., the polymerization was carried out for 3 hours, and then 90 parts of styrene (herein after referred to as ST) were added.

After that, the temperature was raised to 75° C. and then the reaction polymerization was continued for another 7 hours.

After the contents of the reaction vessel were cooled to room temperature to stop the reaction, the obtained polymerization product was separated by filtration, followed by washing well with water and drying at reduced pressure, whereby 97 parts of a white granular block copolymer mixture was obtained.

Part 2

97 parts of the block copolymer mixture were obtained according to same procedures as described in Part 1 of this Reference Example 3 except that a solution which was prepared by dissolving 2.5 parts of the polymeric peroxide obtained in Reference Example 1 into 50 parts of VAC and 50 parts of ST were used.

Part 3

96 parts of the block copolymer mixture were obtained according to the same procedures as described in Part 1 of this Reference Example 3 except that a solution prepared in advance by dissolving 4.5 parts of the polymeric peroxide prepared in Reference Example 1 into 90 parts of VAC and 10 parts of ST were used.

Part 4

According to the same procedures as described in Part 1 of Reference Example 3 (,) except that 10 parts of VAC were mixed with 0.75 part of the polymeric peroxide which was obtained in Reference Example 2, 95 parts of the block copolymer mixture were obtained.

Each 2 g. sample of the VAC-ST block copolymer mixtures obtained in parts 1, 2, 3 and 4 of this Reference Example 3 was weighed and extracted in a Soxhelt's extraction apparatus first with methanol for 24 hours and then with cyclohexane for 24 hours. It was assumed that the decreased amounts of the samples caused by the extraction of methanol and those caused by cyclohexane correspond to the contents of polyvinyl acetate (hereinafter referred to as PVAC for the abbreviation) and of polystyrene (hereinafter referred to as PST for the abbreviation), respectively. It was also assumed that the amounts of the residues of the samples were those of VAC-ST block copolymers.

Furthermore, Nuclear Magnetic Resonance spectra of the residual block copolymers remaining after the extraction were observed. Ratios of the structural units (ST/VAC) were calculated from the ratios of intensities of the chemical shift signals (at 73.0 and 3.5) due to protons of the benzene ring of the ST structural unit and those (at 75.1) due to protons of α-methine of the VAC structural unit.

Block formation efficiencies were also calculated by dividing the amounts of ST introduced into the block copolymers by the polymerization reaction (amounts of the ST structural unit in the block copolymers) by the overall amounts of the polymerized ST (sum of the amounts of the PST and ST structural units in the block copolymers).

Results are listed in Table 1.

TABLE 1

| Block copolymer mixture | Charging ratio of monomer ST/VAC | Composition of VAC - ST block copolymer mixture (%) | | | Ratio of the structural units in VAC-ST block copolymer ST/VAC | Block formation efficiency (%) |
|---|---|---|---|---|---|---|
| | | PST | PVAC | VAC-ST block copolymer | | |
| Part 1 of | 90/10 | 8.2 | 0.9 | 90.8 | 91/9 | 91 |

TABLE 1-continued

| Block copolymer mixture | Charging ratio of monomer ST/VAC | Composition of VAC - ST block copolymer mixture (%) | | | Ratio of the structural units in VAC-ST block coploymer ST/VAC | Block formation efficiency (%) |
| --- | --- | --- | --- | --- | --- | --- |
| | | PST | PVAC | VAC-ST block copolymer | | |
| Reference Example 3 Part 2 of Reference Example 3 | 50/50 | 8.3 | 4.5 | 87.2 | 49/51 | 84 |
| Part 3 of Reference Example 3 | 10/90 | 2.4 | 9.7 | 87.9 | 8/92 | 75 |
| Part 4 of Reference Example 3 | 90/10 | 8.3 | 1.0 | 90.7 | 91/9 | 91 |

Reference Example 4

Preparation of a vinyl acetate-methyl methacrylate block copolymer mixture

Into a glass reaction vessel provided with a thermometer, a stirrer and a condenser, there were charged 300 parts of a 0.2% aqueous solution of polyvinyl alcohol and a solution which was prepared by dissolving 0.5 parts of the polymeric peroxide obtained in Reference Example 1 into 10 parts of VAC.

After the substitution of the air in the reaction vessel with nitrogen gas, the polymerization was initiated by heating the reaction mixture to the temperature of 60° C. Keeping the temperature at 60° C., the polymerization was carried out for 3 hours, and then 90 parts of methyl methacrylate (hereinafter referred to as MMA for the abbreviation) were added. After that, the temperature was raised to 70° C. and then the polymerization was continued for another 5 hours.

After the contents of the reaction vessel were cooled to room temperature to stop the reaction, the polymerization product was separated by filtration, washed well with water and vacuum-dryed to yield 96 parts of a white granular block copolymer mixture.

Reference Example 5

Preparation of an unsaturated polyester resin

A mixture of 812 parts of fumaric acid, 498 parts of isophthalic acid, 396 parts of propylene glycol and 542 parts of neopentyl alcohol was subjected to esterification, whereby an unsaturated polyester (having an acid value of 30) was synthesized. The resultant unsaturated polyester was diluted with ST to adjust the concentration of ST to 35% based on the sum of the amounts of the components. Thus, an unsaturated polyester resin (hereinafter referred to as UPR for the abbreviation) was obtained.

EXAMPLES 1 TO 5

[Preparation of SMC and pressure moulding thereof]

Block copolymer mixtures prepared in Parts 1, 2, 3 and 4 of Reference Example 3 and in Reference Example 4 (,) respectively, were dissolved in ST to produce liquid dispersions containing the block copolymers in a concentration of 30%.

The respective liquid dispersions were mixed together with UPR prepared in Reference Example 5 and other components, according to the following charging recipe;

| | |
| --- | --- |
| UPR | 70 parts |
| 30% ST liquid dispersion of the block copolymer mixture | 30 parts |
| para-Benzoquinone | 0.02 part |
| Calcium carbonate | 100 parts |
| Zinc stearate | 5 parts |
| t-Butyl perbenzoate | 1 part |
| Magnesium oxide | 1 part |
| Chodstrandmat (Product of Nippon Glass Fiber Co., Ltd. Trade mark: EM450-G-1) | 69 parts |
| Pigment Blue (Product of Toyo Ink Co., Ltd. Trade mark: TR2453) | 5 parts | thereby obtaining unsaturated polymer resin compositions, i.e. SMC in Example 1, 2, 3, 4 and 5. The thus-obtained SMC compositions were aged for increasing the viscosity thereof at 40° C. for 20 hours.

Each SMC was subjected to compression molding immediately after the aging and also after storage for 3 mounts subsequent to the aging.

The compression molding was carried out using a metal mold having inner dimensions of 60 mm×60 mm×10 mm, at a compression molding temperature of 140° C. for 4 minutes, whereby molded products having smooth surface and excellent glass were obtained.

Results are listed in Table 2.

COMPARATIVE EXAMPLE 1

Preparation of SMC using polystyrene as the low shrinking agent and compression molding of the obtained SMC Production of SMC and subsequent compression-moulding were carried out according to the same procedures as described in Examples 1 to 5 except that polystyrene was employed instead of the block copolymer mixtures. The results are listed in Table 2.

COMPARATIVE EXAMPLE 2

Preparation of a graft copolymer mixture having a fine gel-structure

Into a glass reaction vessel provided with a thermometer, a stirrer, a condenser and feeding funnel, there were charged 44 parts of polybutadiene latex (JSR 0700, made by Japan Synthetic Rubber Co., Ltd.) a small amount of sodium laurate and a polymerization promotor, and 200 parts of water.

Then after the substitution of the air in the reaction vessel with nitrogen gas, a mixture of 50 parts of MMA, 25 parts of ST and small amounts of cumyl hydroperoxide and t-dodecyl mercaptan was charged into the vessel dropwise for 5 hours at 60° C.

After the completion of the reaction, an antioxidant was added to the reaction mixture, which was then subjected to a coagulation and heat-treatment, and further washing and drying, thereby obtaining a powdery polymer material.

at 40° C., SMC were subjected to a compression molding by using a mold having dimensions of 60 mm×60 mm×10 mm under a molding pressure of 100 kg/cm² at a compression-molding temperature of 140° C. for 4 minutes.

The characteristics of the moulded products are shown in Table 3.

TABLE 2

Characteristics of compression moulded product from SMC

|  | Low shrinking agent employed | Gloss *1 | | Surface smoothness *1 | | Shrinkage *2 | |
|---|---|---|---|---|---|---|---|
|  |  | Right after aging | After storage for 3 months | Right after aging | After storage for 3 months | Right after aging | After storage for 3 months |
| Example 1 | Block copolymer mixture of Part 1 in Reference example 3 | O | O | O | O | 0.02 | .0.5 |
| Example 2 | Block copolymer mixture of Part 2 in Reference example 3 | O | O | O | O | −0.04 | 0.03 |
| Example 3 | Block copolymer mixture of Part 3 in Reference example 3 | O | O | O | O | −0.02 | 0.02 |
| Example 4 | Block copolymer mixture of Part 4 in Reference example 3 | O | O | O | O | 0.02 | 0.05 |
| Example 5 | Block copolymer mixture of Part Reference example 4 | O | O | O | O | 0.02 | 0.05 |
| Comparative Example 1 | P S T | O | X | O | X | 0.05 | — |
| Comparative Example 2 | Graft copolymer having fine gel structure | O | X | O | X | 0.06 | — |

Note:
*1; O shows good appearance in gloss and smoothness of the moulded product X shows bad appearance
*2; Because SMC of comparative Examples 1 and 2 which were storaged for 3 months were bad in the surface conditions and the shrinkage, there was not measured.

Preparation of SMC and compression molding

Preparation of SMC and compression molding of the product SMCs were carried out in the same way as described in Example 1 to 5 except for using the above obtained graft copolymer mixture instead of the block copolymer mixtures. The results were listed in Table 2.

From the results of Table 2, it is apparent that SMC produced by using the low shrinking unsaturated polyester resin compositions of this invention are superior to conventional SMC, since they exhibit a low shrinkage on hardening even after storage for 3 months and can produce hardened molding products having a smooth and bright surface.

EXAMPLE 6 TO 9

[Preparation of SMC and compression-molding]

SMC were prepared according to the same procedures as described in Examples 1 to 4 except for using 100 parts of a blended mixture prepared by blending the 30% styrene liquid dispersion of the VAC-ST block copolymer mixture, which was prepared in Part 2 of Reference Example 3, with the UPR prepared in Reference Example 5 in the respective blending ratios of the Examples as shown in Table 3. After aging for 20 hours

TABLE 3

Evaluation of compression-moulded product from SMC

| | UPR/A (weight ratio) | Gloss | Surface smoothness | Shrinkage (%) |
|---|---|---|---|---|
| Example 6 | 95/5 | O | O | 0.02 |
| Example 7 | 85/15 | O | O | 0.00 |
| Example 8 | 50/50 | O | O | −0.04 |
| Example 9 | 40/60 | O | O | −0.04 |

Note:
Marks in the gloss and surface smoothness are the same as those described in TABLE 2

The embodiments of the invention in which an exclusive property or privilege is claimed are defined as follows:

1. In a molding composition having low shrinkability, which comprises
  (a) from 20 to 70% by weight of unsaturated polyester resin;
  (b) from 20 to 70% by weight of a first polymerizable monomer effective for reducing the shrinkability of said unsaturated polyester resin upon hardening thereof; and
  (c) an agent for improving the dispersion stability of the mixture of (a) and (b)
  the improvement which comprises: said agent (c) consists essentially of from 1 to 20% by weight, based on the weight of said composition, of a block copolymer prepared by polymerizing, (i) from 10 to 90 parts by weight of a monomer or monomer mixture consisting essentially of from 70 to 100% by weight of vinyl acetate and from 30 to 0% by weight of a second monomer copolymerizable with vinyl acetate, or (ii) from 90 to 10 parts by weight of a monomer or monomer mixture consisting essentially of from 0 to 100% by weight of a styrene-type monomer and 0 to 100% by weight of an acrylate or methacrylate monomer, in the presence of a polymeric peroxide as a polymerization initiator, said polymeric peroxide having the formula

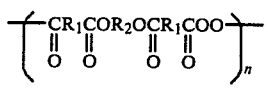

wherein $R_1$ is alkylene or substituted alkylene having 1 to 18 carbon atoms, cycloalkylene or substituted cycloalkylene having 3 to 15 carbon atoms, or phenyl or substituted phenylene having 6 to 15 carbon atoms, and $R_2$ is (1) alkylene or substituted alkylene having 2 to 10 carbon atoms, (2) a group having the formula

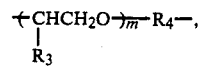

wherein $R_3$ is hydrogen or methyl, $R_4$ is alkylene or substituted alkylene having 2 to 10 carbon atoms and m is an integer of 1 to 13, (3)

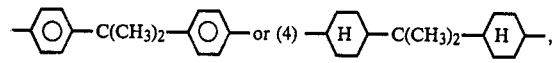

and n is an integer from 2 to 10 to obtain a first copolymer having peroxy bonds in the molecule, and then effecting a second polymerization of said first copolymer with the other of (i) and (ii) that was not used in the first polymerization, thereby to obtain said block copolymer.

2. A molding composition as claimed in claim 1, wherein in obtaining said block copolymer, the amount of the polymeric peroxide is 0.1–10 parts by weight for 100 parts of the monomer or the monomer mixture used in said first polymerizing step, the polymerization temperature is 40°–90° C. and the polymerization time is 2–15 hours.

3. A molding composition as claimed in claim 1 or claim 2, containing blended therein one or more additive agents selected from the group consisting of filler, pigment, thickening agent, fibrous reinforcement, hardening agent and mold releasing agent.

* * * * *